July 14, 1925. 1,546,251
M. A. POSSONS
HANDLE
Filed May 9, 1924
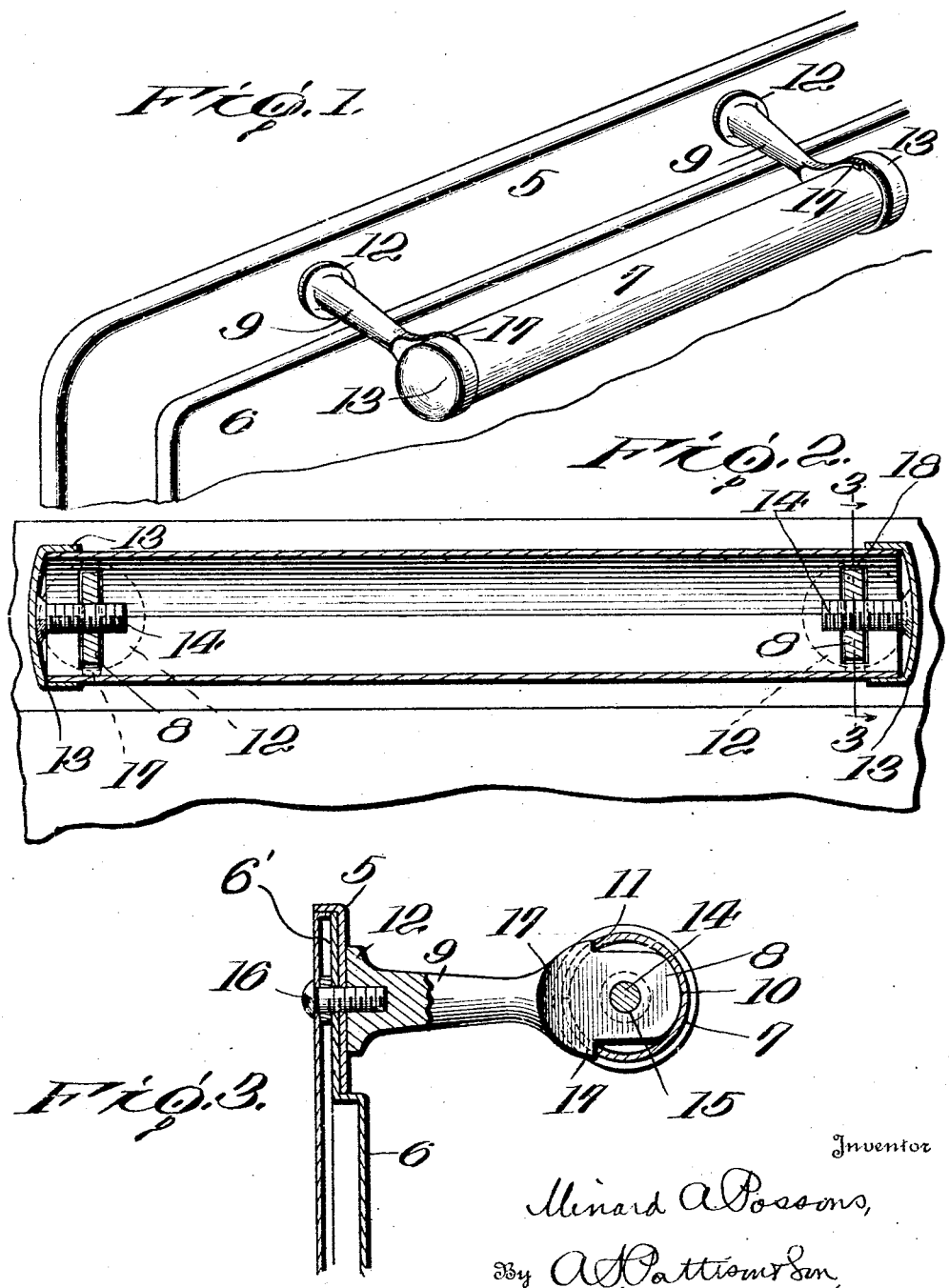

Patented July 14, 1925.

1,546,251

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

HANDLE.

Application filed May 9, 1924. Serial No. 712,101.

*To all whom it may concern:*

Be it known that I, MINARD A. POSSONS, a citizen of the United States, residing at Cleveland, in the county of Cuyahoga and State of Ohio, have invented certain new and useful Improvements in Handles, of which the following is a specification, reference being had therein to the accompanying drawing.

This invention relates to improvements in handles and pertains more particularly to a handle of novel construction especially adapted for use in connection with stoves.

Heretofore it has been common practice to provide solid porcelain handles for the oven and other doors for stoves but this practice is expensive and furthermore the handles are very fragile and they are therefore very often broken or cracked when the stoves are in the hands of the users. Additionally there is a loss of many handles in the manufacture of them and many handles are also broken or cracked while the stoves are in transit to the stove users or purchasers.

One object of my invention is to provide a handle of novel construction which gives the effect and appearance of a solid porcelain handle.

Another object of my invention is to provide a handle which is very strong and at the same time of very good appearance.

Another and further object of my invention is to provide a handle of novel construction which is assembled and fastened in place in such a manner that no bolt or screw heads are visible.

A still further object of my invention is to provide an improved handle of a novel construction which is cheap and simple of manufacture and highly efficient and durable in use.

Another and still further object of my invention is to provide a handle of an improved construction which is very easily and quickly assembled and mounted.

Other objects and novel features of construction and improved results of my handle will appear in the following description and accompanying drawings.

In the drawings:

Figure 1 is a perspective view of my improved handle, the handle being shown mounted upon an oven door.

Figure 2 is a longitudinal vertical sectional view through the handle.

Figure 3 is a transverse vertical sectional view through the handle taken on a line 3—3 of Fig. 2, a portion of an oven door also being shown in section.

In the drawings I have shown the preferred embodiment of my invention but I desire it to be understood that the construction could be varied in many minor details without departing from the spirit of my invention and although I have shown the handle as applied to a stove oven door it will be readily understood that handles constructed in accordance with the invention can be used in the many places and manners to which handles are commonly applicable.

Referring now to the drawings in which like and similar parts are designated by similar reference numerals throughout the description, 5 indicates an oven door provided as is usual in stove oven doors with an enameled front or panel 6.

The handle or hand grip proper consists of a hollow tube 7 preferably constructed of metal, the tube being coated on its exterior with a vitreous enamel to add to the general appearance. The metal of which the tube is constructed is fairly heavy making the hand grip strong and solid, and also giving to the handle the appearance of a common solid porcelain handle before mentioned as the handle now in common use. The handle or hand grip 7 is provided with openings or slots 18 adjacent its ends and these openings are of a size adapted to receive the elongated and flattened ends 8 of the brackets 9. As clearly appears in Figure 3 of the drawings the extreme outer ends of the flattened portion 8 of the brackets are rounded so that these ends can snugly abut the inner curved surface of the hand grip 7 as clearly appears at 10. The flattened portions 8 of the brackets are further provided with shoulders 11 which project laterally from the flat ends 8 forming enlargements which abut against the ends of the slots 18, as shown in Fig. 3. The inner ends of the brackets 9 are provided with heads 12 which are for the purpose of both giving strength to the brackets and adding to their general appearance. To further add to the appearance of the entire handle the brackets 9 are preferably nickel plated or made of a material which can be given a polished finish.

The open ends of the handle or hand grip 7 are closed by ferrules 13 to the inner center of which are suitably fastened as by spot welding the screw threaded bolts 14. These ferrule bolts 14 are adapted to screw-threadably engage the openings 15 in the flattened ends of the brackets 9.

The brackets are fastened to the oven or other doors to which the handle may be applied by bolts 16 which pass through the door-frame 5; the part 6' of the panel 6; the door lining, and which screw into suitable openings in the heads 12 of the brackets.

From the foregoing it will be seen that to assemble my improved handle it is only necessary to insert the flattened ends of the brackets into the slots or openings 18 and to then fasten the brackets to the hand grip 7 by screwing the ferrules upon the open ends of the hand grip. The handle is then fastened in any desired place by the use of the screws or bolts 16 which enter the rear of the heads 12 of the brackets. From the foregoing it will be seen that there are no bolt or screw heads visible in the mounted handle. Attention is directed to the fact that to add to the appearance of the handle the ferrules 13 are nickel plated or made of a metal which can be given a high polish.

It will further be seen that I have provided a handle which is very strong but at the same time is simple and cheap of construction and manufacture. Furthermore much time and labor in the manufacture of the stove is saved by the fact that the handle is very quickly and easily mounted upon the stove.

Attention is also directed to the fact that the flattened portions 8 of the brackets are also provided with shoulders 17 and it will be seen that when the ferrules are screwed into place that their inwardly extending edges will approximately abut these shoulders.

Having thus described my invention what I claim and desire to secure by Letters Patent is:

1. An improved handle comprising a grip member having at its ends longitudinal openings and transverse openings connecting therewith, supporting brackets having their outer ends extending through the side openings and each provided with screw-threaded openings, and a screw adapted to pass inwardly through the longitudinal opening in the bracket and into the opening of the flat end for securing the parts together.

2. An improved handle construction comprising a hollow grip member having near its opposite ends transverse openings, supporting members having their outer ends passing through the side openings of the grip portion and each provided with a screw-threaded opening, of screw members passing into the openings in the supporting members and the outer portions of the screw members engaging the ends of the grip-member, whereby the parts are secured together.

3. An improved handle construction comprising a hollow grip-member, having near its end a transverse opening, a supporting bracket having its outer end passing through the side opening and provided with a screw-threaded opening, of a ferrule member for the end of the grip portion, said ferrule member carrying a screw-bolt adapted to pass into the opening of the said bracket thereby securing the parts together.

4. An improved handle construction comprising a hollow grip member having side openings near its ends, of bracket-supports having their ends passing through the side openings and having a bolt opening, of ferrule members fitting the ends of the hollow grip, the ferrule members carrying screw bolts passing into the openings in the ends of the supporting brackets, whereby the parts are secured together.

5. An improved handle construction comprising a hollow grip-member having side openings near its ends, of supporting brackets having their outer ends passing through the said side openings and each having a bolt opening arranged substantially central in respect to the grip member, of ferrule members embracing the ends of the grip-members and carrying inwardly extending bolts engaging in the openings of the said brackets, whereby the ferrule members secure the parts together.

6. An improved handle construction for oven doors and the like, comprising a door having a lining at its inner side, the said parts having a bolt opening therethrough; a handle supporting bracket having its inner end provided with a longitudinal opening, a bolt passing from the inner side of the door into the said bracket opening, a hollow grip member having near its end a transverse opening at its inner side, the end of the bracket extending through the said opening and having a bolt opening, and a ferrule closing the hollow end of the grip and carrying an inwardly extending bolt passing into the opening in the said bracket member, whereby the parts are secured together.

In testimony whereof I hereunto affix my signature.

MINARD A. POSSONS.